(12) United States Patent
Tsui et al.

(10) Patent No.: US 6,292,128 B1
(45) Date of Patent: Sep. 18, 2001

(54) TIME DOMAIN DETECTION AND CLOCKLESS LOGIC ELECTRONIC WARFARE RECEIVER

(75) Inventors: James B. Y. Tsui; Marvin N. Potts, both of Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/542,380

(22) Filed: Apr. 4, 2000

(51) Int. Cl.[7] .................................................. G01S 7/40
(52) U.S. Cl. ..................... 342/13; 342/192; 342/194; 342/196
(58) Field of Search ..................... 342/13, 16, 17, 342/18, 19, 192, 194, 196

(56) References Cited

U.S. PATENT DOCUMENTS

| | | | |
|---|---|---|---|
| 5,678,219 | * 10/1997 | Agarwal et al. | 455/280 |
| 5,999,561 | 12/1999 | Naden et al. | 375/206 |
| 6,002,363 | 12/1999 | Krasner | 342/357.1 |
| 6,028,886 | 2/2000 | Koga et al. | 375/202 |
| 6,043,771 | * 3/2000 | Clark et al. | 342/13 |
| 6,085,077 | * 7/2000 | Fields et al. | 455/303 |

* cited by examiner

*Primary Examiner*—John B. Sotomayor
(74) *Attorney, Agent, or Firm*—Gerald B. Hollins; Thomas L. Kundert

(57) ABSTRACT

A broadband radio receiver of the type usable in receiving and identifying the pulsed signals of radar transmitters in an electronic warfare environment. The receiver includes signal presence detecting apparatus in the form of a time domain signal detection apparatus usable in maintaining complex signal processing portions of the receiver, such as its fast Fourier transform generation circuit, in quiescent low energy dissipating status until needed to perform signal analysis. Such energy conservation enables use of the receiver in energy limited remote or space received environments. Energy conserving "clockless logic" or "null convention logic" is preferably used in embodying greater energy dissipating portions of the receiver.

14 Claims, 4 Drawing Sheets

US 6,292,128 B1

TIME DOMAIN DETECTION AND CLOCKLESS LOGIC ELECTRONIC WARFARE RECEIVER

RIGHTS OF THE GOVERNMENT

The invention described herein may be manufactured and used by or for the Government of the United States for all governmental purposes without the payment of any royalty.

BACKGROUND OF THE INVENTION

This invention relates to the field of radio frequency signal reception apparatus of the type useful in monitoring a plurality of electronic warfare-dedicated radio frequency signal sources and to the low energy embodiments of such reception apparatus.

The conventional digital electronic warfare radio receiver can be divided into the three functional portions represented in FIG. 1 of the drawings. The first of these portions at, 100 in FIG. 1, is an analog-to-digital converter (ADC) used to digitize the input microwave frequency signals received on the path 104. The second receiver portion at 102 in FIG. 1 performs a frequency analysis, for example a fast Fourier transform (FFT) operation, by which the frequency domain characteristics of the analog-to-digital converter 100 output signals are determined—thereby enabling consideration and analysis of the input signal spectra. The third receiver functional portion at 104 in FIG. 1 comprises encoding logic, which uses the output of the fast Fourier transform operation at 102 to identify the input signal frequencies. In the FIG. 1 electronic warfare receiver it is notable that the analog-to-digital converter 102 and fast Fourier transform apparatus perform continuous processing of the receiver input signals from path 104. Because of this continuous processing, particularly in the fast Fourier transform operation, conventional electronic warfare receivers are frequently difficult to use in energy limited environments.

SUMMARY OF THE INVENTION

The present invention provides a low energy consumption electronic warfare signal radio receiver combining the benefits of simple signal presence detection with low energy requirements additional signal processing.

It is an object of the present invention therefore to provide a low energy consumption electronic warfare signal radio receiver combining the benefits of time domain signal detection with signal processing accomplished by on-demand operating clockless logic electrical circuitry.

It is an object of the present invention therefore to provide a low energy consumption electronic warfare radio receiver.

It is another object of the invention to provide a electronic warfare radio receiver combining the benefits of time domain signal detection with clockless logic electrical circuitry.

It is another object of the invention to provide an electronic warfare radio receiver affording improved signal time of arrival resolution capability.

It is another object of the invention to provide an electronic warfare radio receiver affording improved time and frequency resolutions.

It is another object of the invention to provide an electronic warfare radio receiver arrangement in which selected portions of the receiver are also usable in a communications radio receiver.

It is another object of the invention to provide an electronic warfare radio receiver arrangement in which sample skipping algorithms are used in several portions of the receiver.

It is another object of the invention to provide an electronic warfare radio receiver in which time domain signal presence detection is employed.

It is another object of the invention to provide an electronic warfare radio receiver in which the combination of time domain signal detection and clockless logic fast Fourier transformation processing are utilized to advantages such as receiver power requirements.

It is another object of the invention to provide an electronic warfare radio receiver in which a simple I and Q signal included form of time domain signal detection is employed.

Additional objects and features of the invention will be understood from the following description and claims and the accompanying drawings.

These and other objects of the invention are achieved by low energy consumption time domain signal detection and clockless logic digital electronic warfare radar signal radio receiver apparatus comprising the combination of:

time domain signal detection signal presence sensing electrical circuit apparatus, including a received signal conveying channel portion therein, connected to a received signal input port of said electronic warfare radar signal radio receiver apparatus and generating a receiver control output signal in response to presence of a received radar signal in said received signal conveying channel portion therein;

clockless logic, electrical energy dissipating, received signal processing electrical circuit apparatus connected with said received signal conveying channel portion of said time domain signal detection signal presence sensing electrical circuit apparatus and enabled by an active state of said receiver control output signal of said time domain signal detection signal presence sensing electrical circuit apparatus;

said time domain signal detection signal presence sensing electrical circuit apparatus further including:
- a ninety degree hybrid circuit having In phase and Quadrature phase output signals of said radar signal radio frequency;
- a local oscillator-inclusive radio frequency signal mixer circuit having lower intermediate radio frequency In phase and Quadrature phase output signals in response to input of said In phase and Quadrature phase output signals of said ninety degree hybrid circuit;
- first and second analog to digital converter circuits receiving said intermediate radio frequency In phase and Quadrature phase signals and generating In phase and Quadrature phase digital output signals, output signals also comprising said received signal conveying channel portion signals;
- first and second signal data squaring circuits connected with said channel portion In phase and Quadrature phase digital output signals of said first and second analog to digital converter circuits and generating data squared versions of said In phase and Quadrature phase digital output signals;
- an In phase and Quadrature phase digital output signal summation circuit connected with output signals of said first and second signal data squaring circuits;
- a selected threshold circuit connected with an output port of said signal summation circuit and with a source of selected amplitude threshold reference signal and generating said receiver control output signal;

said clockless logic electrical energy dissipating received signal processing electrical circuit apparatus further including:

a clockless logic fast Fourier transform generating electrical circuit having an input port connected with said received signal conveying channel portion signals and enabled by said receiver control output signal; and a clockless logic fast Fourier transform signal encoding circuit connected with said fast Fourier transform generating electrical circuit and generating a received signal coded output signal of said electronic warfare radar signal radio receiver apparatus.

DETAILED DESCRIPTION

Figure 1:
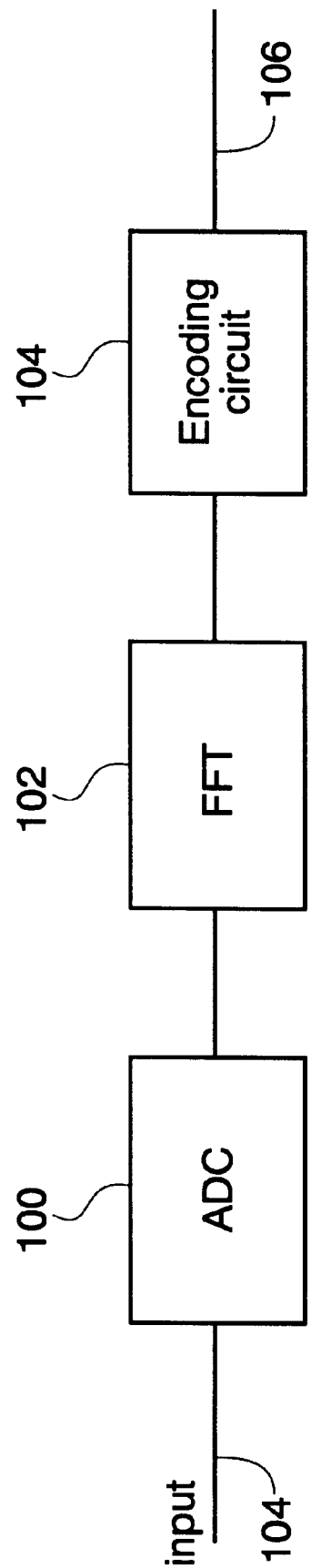
FIG. 1 shows primary parts of a conventional electronic warfare radio receiver in block diagram form.

FIG. 1 in the drawings shows the major functional elements of an electronic warfare radio receiver. The FIG. 1 receiver is shown in a simplified form without representation of, for example, the known in the art amplifiers which are of course also present. In the FIG. 1 electronic warfare radio receiver, a receiver which may be considered of a conventional type, the second block of the receiver, i.e., the fast Fourier transform operation, functions by considering a certain number of data points, for example 256 data points, of receiver input signal from path 104, and performs the fast Fourier transformation on this sample of data.

Figure 2:
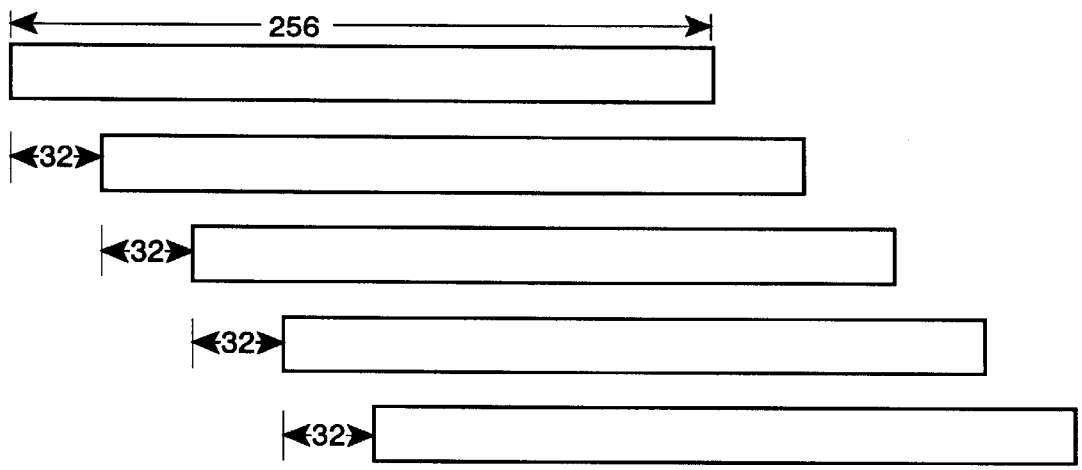
FIG. 2 illustrates performance of fast Fourier transformation on a data sample using a sample skipping arrangement.

In the FIG. 1 receiver the fast Fourier transform operation is performed continuously on successive input data samples while skipping a certain number of data points in each successive transformation cycle accomplished, e.g. skipping 32 data points, as shown in FIG. 2. Because generation of the fast Fourier transform is a rather complicated mathematical operation and requires multiple levels of signal generation logic circuitry in its electronic embodiment form, it is difficult to perform such operations in real time by skipping only one data point at a time as is desirable in such a transformation operation. Present day electronic circuits although markedly improved in operating speed over those of one, five or ten years ago are nevertheless incapable of operating in real time at the speed needed for time to frequency domain transformations needed in a useful electronic warfare receiver. Therefore compromise in such form as the data point skipping shown herein is needed in practical real time transformation embodiments. Using a 256 point sample the maximum number of input data points skipped can be 256 without losing information since no data point of the path 104 input signal escapes consideration in such transforms.

Since fine time of arrival resolution is a sorting parameter in a receiver of the FIG. 1 type it merits consideration in evaluating receiver performance. In the FIG. 1 and FIG. 2 sampling the time of arrival (TOA) resolution ($\Delta$TOA) is equal to the sampling time, times the number of skipping points or $$\Delta TOA = N_s t_s = N_s / f_s \quad (1)$$

where $N_s$ is number of samples skipped and $t_s$, $f_s$ are the sampling time and frequency respectively. If for example the input signal is sampled at a sampling rate of 3 GHz, the corresponding sampling time is 0.33 ns. If 32 samples are skipped between fast Fourier transform events, the time resolution ability of the FIG. 1 and FIG. 2 system is about 10.7 ns (0.33 ns×32). Notably therefore the FIG. 1 and FIG. 2 system when embodied in a conventional manner operates continuously at a certain clock rate related to the sampling frequency even if there is no input signal. The encoding circuit at 104 in FIG. 1 also operates in a continuous manner. These continuous operations and their energization requirements suggest a need in the art for an electronic warfare receiver of the energy requirements-considered present invention type.

Signal presence detection in an improved version of the FIG. 1 receiver may be accomplished through use of time domain signal detection; such detection can be arranged to accomplish relatively fine time of arrival signal detection. For present improvement purposes such digital time domain signal detection may use the I and Q (in phase and quadrature phase) signal detection represented in block 428 in FIG. 4 of the drawings. A detector of this type combines these I and Q signals to accomplish a digital time domain signal detection. Use of combined I and Q signals to accomplish a digital time domain signal detection is desirable because the detection of unknown signal presence is readily accomplished in the absence of prior signal amplitude knowledge using such I and Q signal techniques.

Figure 3:
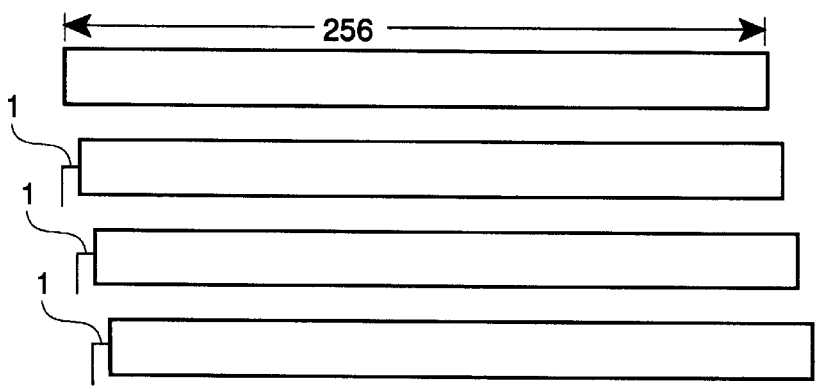
FIG. 3 shows use of a data skipping arrangement in performance of time domain signal detection.

Other approaches are possible to perform a time domain signal detection. One of these approaches is to accumulate the output from N signal samples in an accumulator device, e.g. accumulate the data representing 256 points along the input signal of path 104 in FIG. 1, and compare the summation of the accumulated signal with a certain threshold. If there are signals in the path 104 data following its digitization in the block 100, the output of such an accumulating device will cross the established threshold, otherwise, the output will not cross the threshold. Since this summation method is very simple, this arrangement of a time domain signal detection operation can be performed by skipping the input data by only 1 point as is shown in FIG. 3 of the drawings.

The time resolution achieved in the time domain signal detection is equal to the sampling time. If the signal is sampled at 3 gigahertz for example, the time resolution achieved in the detection is 0.33 ns. Additional details regarding the FIG. 3 time domain signal detection may be understood from my published textbook "Digital Techniques for Wideband Receivers" additionally identified below herein. Chapter 4, particularly section 4.7 of chapter 4 and chapter 9, particularly section 9.31 of chapter 9 each discuss the concept of "sliding fast Fourier transform detection" as represented in the FIG. 3 drawing herein.

Figure 4:
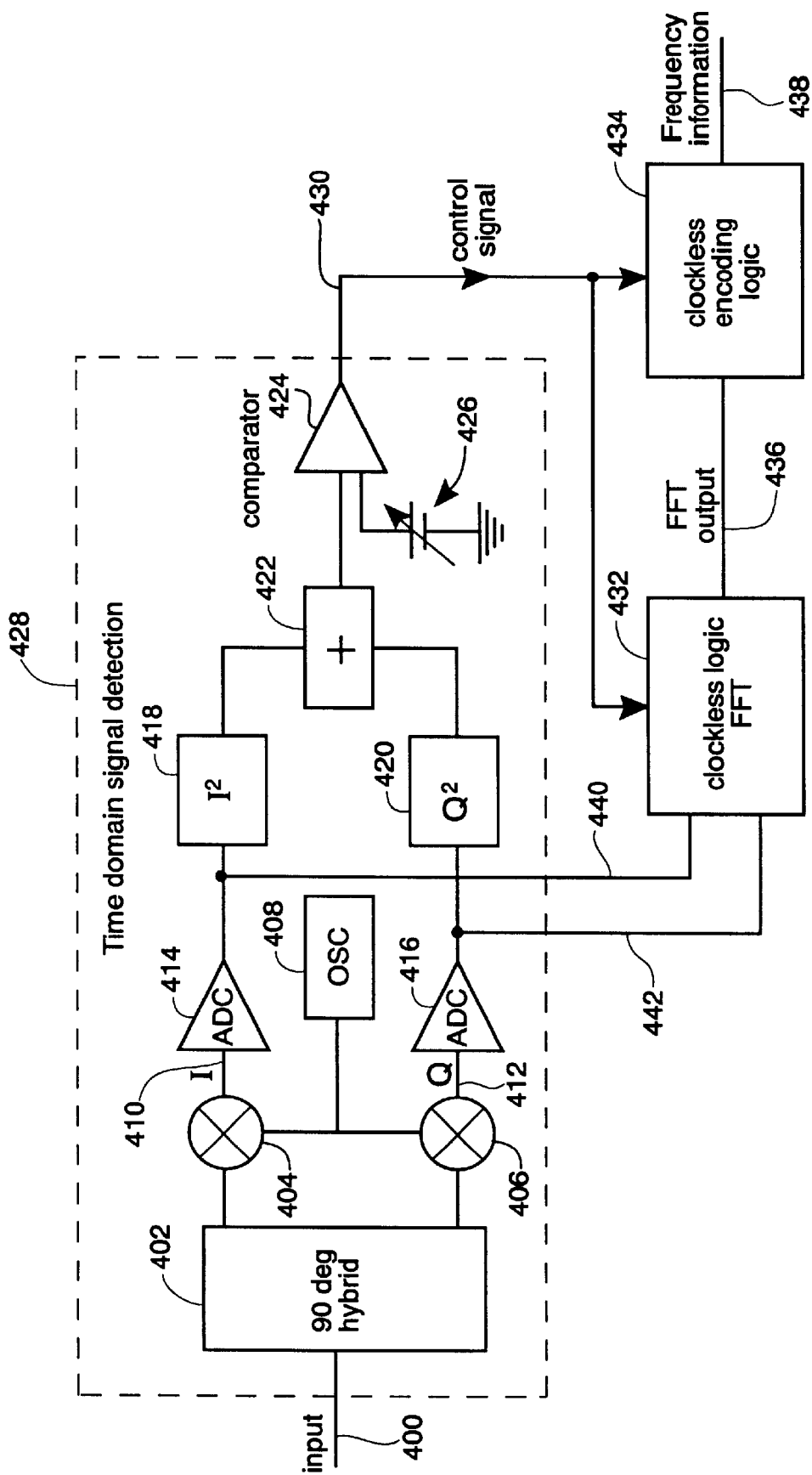
FIG. 4 shows a digital time domain signal detection and clockless logic electronic warfare receiver according to the invention.

Even though the FIG. 1 electronic warfare radio receiver is generally speaking a prior art device, a particular embodiment of such a receiver may rise above the level of prior art teachings in its use of a new algorithm embodiment or new components or other new concepts. One such new arrangement of the FIG. 1 electronic warfare radio receiver may for example include a clockless logic embodiment of receiver components as shown in FIG. 4 herein. In the FIG. 4 receiver arrangement the clockless logic concept is desirably used in the fast Fourier transform and encoding logic portions of the receiver as are represented at 432 and 434.

The clockless logic concept may in general be understood to mean an logic embodiment wherein major portions of the logic circuitry, rather than being operational on a full time basis, are disposed to remain in a quiescent state until enabled in response to a signal processing need. Such logic embodiments need not be limited to asynchronous circuitry but may include clock generators and other synchronizing circuits which are also operated on demand rather than being of a full time nature. The fundamental idea of such circuitry is therefore that the logic does not operate in a continuous manner but instead works only on demand. If a command signal is provided, the logic can start to operate. This logic can be notably efficient in power consumption, if operated only at low duty cycle.

Several aspects of such clockless logic have been disclosed in the U.S. Patent art as is recited in detail in a subsequent paragraph herein. Logic circuitry of this type is also known by the name of "Low Power Null Convention Logic" a name which appears to have trademark significance and also as "Null Convention Logic". Logic circuitry of this type appears to originate with persons associated with a company by the name of "Theseus Logic Incorporated" of St. Paul Minn. and Orlando, Fla. Such logic circuitry appears also to be the subject of several current technical development efforts including efforts involving funding originating with the U.S. Government's Defense Advanced Research Projects Agency, DARPA, and involving organizations including The Advanced Technology Group of Sanders, a Lockheed Martin company, The University of Central Florida and Motorola Incorporated. Published articles regarding these efforts have appeared in the periodical "Semiconductor Business News" on Jul. 30, 1999 for example and in other periodicals. Additional published information regarding these efforts may be identified on the world wide web using the search term "Clockless Logic" for example in the search engine "Yahoo" or its equivalent.

Patents involving clockless logic that are currently issued and involve Theseus Logic Incorporated or an apparently related company include U.S. Pat. No. 6,031,390, K. M. Fant et al.; U.S. Pat. No. 6,020,754, G. E. Sobelman et al.; U.S. Pat. No. 5,986,466, G. E. Sobelman et al.; U.S. Pat. No. 5,977,663, K. M. Fant et al.; U.S. Pat. No. 5,930,522, K. M. Fant et al.; U.S. Pat. No. 5,907,693, K. M. Fant et al.; U.S. Pat. No. 5,896,541, K. M. Fant et al.; U.S. Pat. No. 5,828,228, K. M. Fant et al.; U.S. Pat. No. 5,805,461, K. M. Fant et al.; U.S. Pat. No. 5,796,962, K. M. Fant et al.; U.S. Pat. No. 5,793,662, D. A. Duncan et al.; U.S. Pat. No. 5,764,081 K. M. Fant et al.; U.S. Pat. No. 5,664,212, K. M. Fant et al.; U.S. Pat. No. 5,664,211, G. E. Sobelman et al.; U.S. Pat. No. 5,656,948, G. E. Sobelman et al.; U.S. Pat. No. 5,652,902, K. M. Fant; U.S. Pat. No. 5,640,105; G. E. Sobelman et al.; U.S. Pat. No. 5,572,732, K. M. Fant et al.; U.S. Pat. No. 5,355,496, K. M. Fant et al.; U.S. Pat. No. 5,305,463, K. M. Fant et al; U.S. Pat. No. 5,161,013, K. S. Rylander et al. U.S. Pat. No. 4,835,532, K. M. Fant et al.; U.S. Pat. No. 4,667,190, K. M. Fant et al.; and U.S. Pat. No. 4,645,459, K. M. Fant et al.; These twenty four patents issued between Feb. 24, 1987 and Feb. 29, 2000 and involve performance of numerous logic operations of interest in implementing functions of the present invention. The contents of these patents are hereby incorporated by reference herein. Several of these patents, as are marked by the asterisk symbol immediately following the patent number, involve the function of performing a data transformation operation for example.

A significant aspect of the present invention is thus to combine the operations of digital time domain signal detection and clockless logic in order to fabricate an improved electronic warfare receiver. Such a receiver receives radar signals which may have low duty cycle at low signal density and may therefore, when embodied in clockless logic form, be characterized by relatively low energy requirements and suitability for remote location or orbital use for example. In contrast with such an improved receiver a conventional digital electronic warfare receiver for example, enables the fast Fourier transform function of block 102 continuously and thereby consumes relatively large quantities of power.

FIG. 4 in the drawings therefore shows the preferred arrangement for a digital time domain signal detection and clockless logic electronic warfare receiver according to the present invention. The FIG. 4 receiver is also shown in a simplified form without representation of for example the conventional amplifiers and other circits which are of course also present. In the FIG. 4 receiver an input signal communicated along the path 400 is divided into quadrature-disposed signals appearing on the two paths 410 and 412 by at 90 degree hybrid device 402. In FIG. 4 the quadrature phase related or I and Q output signals of the hybrid 402 are down converted to a selected intermediate frequency (IF) using the two mixer circuits 404 and 406 and the local oscillator circuit 408. The down converted I and Q signals appear on the paths 410 and 412 in the FIG. 4 receiver and are digitized by two analog-to-digital converter circuits 414 and 416.

The output signals from the analog-to-digital converter circuits 414 and 416 in FIG. 4 are coupled into two digital squaring circuits 418 and 420. The output signals of the squaring circuits 418 and 420 are summed together in the summation circuit 422, possibly in the manner described in connection with FIG. 5, and the resulting sum signal compared with a selected threshold level. Such a selected threshold level is represented by the variable amplitude source 426, and comparison may be accomplished using a comparator circuit embodied in the form of a threshold-connected summing amplifier 424. The output of the comparator circuit amplifier 424 is used to control the clockless logic fast Fourier transform circuit at 432 and the clockless encoding logic circuits 434. The digitized I and Q signal outputs of the analog-to-digital converter circuits 404 and 406 are also used as input signals for the fast Fourier transform circuit at 432 by way of the paths 440 and 442 if these signals cross the established threshold. In the FIG. 4 electronic warfare receiver the components commencing with the 90 degree hybrid device 402 and ending with the comparator amplifier 424 may be considered to comprise a time domain signal detection apparatus portion of the receiver—as is indicated by the legend number 428.

Encoded frequency identification information characterizing the signals received by the FIG. 4 receiver appear on the path 438 at the output of the clockless encoding logic circuits 434. Use of the clockless logic circuits indicated for the fast Fourier transform circuit at 432 and the clockless encoding logic circuits at 434 are particularly notable points of the FIG. 4 receiver. Use of combined $I^2$ and $Q^2$ signals as accomplished at block 424 if the FIG. 4 electronic warfare receiver may imply concurrent use of a square-root circuit operating on the squared and combined signals of path 430 even though such a square root circuit is not shown in the FIG. 4 drawing.

Figure 5:
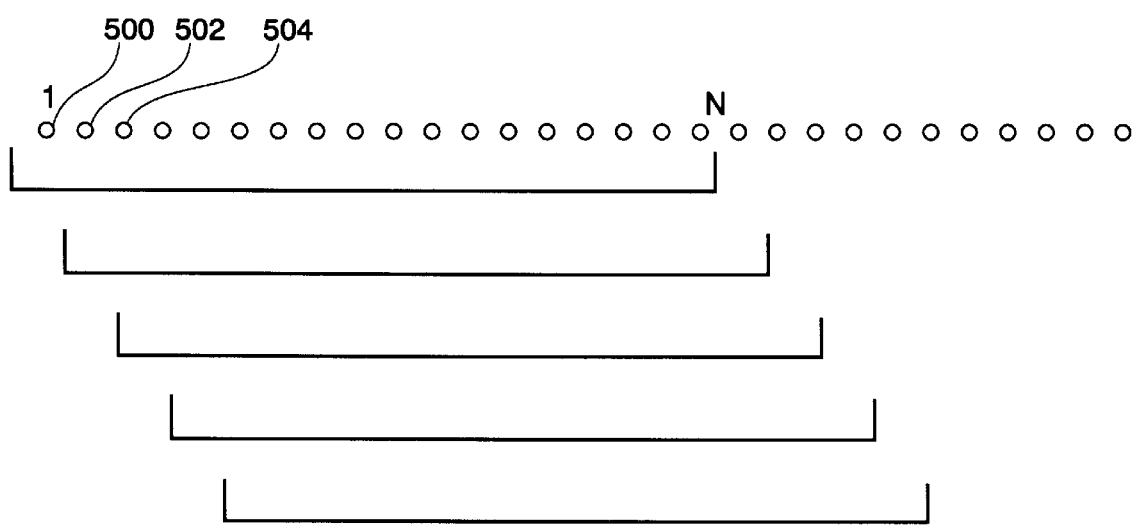
FIG. 5 shows a data summation arrangement usable in the FIG. 4 receiver.

A data summation algorithm usable in the summation block 422 of the FIG. 4 digital time domain signal detector 428 is described in the drawing of FIG. 5 herein. In FIG. 5 each data point 500, 502, 504 etc. represents the $I^2(i)+Q^2(i)$ summation accomplished in block 422 of the FIG. 4 electronic warfare receiver where i=1, 2, 3, . . . The summation from i=1 to i=N in block 422 can be expressed mathematically as $$\text{Sum}(1) = \sum_{i=1}^{N} [I^2(i) + Q^2(i)] \quad (2)$$

The summation from i=2 to i=N+1 can be expressed by taking the sum again, this time from i=2 to i=N or alternately and more simply can be written from the results of Equation (2) as $$\text{Sum}(2) = \sum_{i=2}^{N+1} [I^2(i) + Q^2(i)] \quad (3)$$

$$= \text{Sum}(1) - [I^2(1) + Q^2(1)] + [I^2(N+1) + Q^2(N+1)]$$

In this operation the new result is obtained from the previous result by adding and subtracting one term. In general the summation of k+1 can be written in terms of k as $$\text{Sum}(k+1) = \text{Sum}(k) - [I^2(k) + Q^2(k)] + [I^2(N+k) + Q^2(N+k)] \quad (4)$$

This equation 4 operation consists only of one summation and one subtraction and therefore can be implemented at high speed in electronic circuit form.

The threshold level represented by the variable amplitude source 426 in FIG. 4 is used for the purpose of eliminating noise-related signals from the output of the comparator amplifier 424 and to insure this output signal actually represents the presence of valid data in the input signal of path 400 in FIG. 4. Once the established threshold is crossed by a summed signal, the output of the comparator amplifier 424 in FIG. 4 causes the clockless fast Fourier transform implementation of block 432 and the encoding circuit of block 434 to start operating. Under this condition, the input to the fast Fourier transform is guaranteed to contain signals and receiver energy supply is not used in an unnecessary manner. When there is only noise in the input to the fast Fourier transform circuit 432, the fast Fourier transform algorithm and the encoding circuits of block 434 do not operate, because noise will not be strong enough to exceed the selected threshold level and initiate output from the time domain detection circuit 428.

Since the time domain detection circuit in the FIG. 4 receiver operates by sliding the input data to the right at the rate of one data bit of a word sample as is illustrated in the FIG. 5 drawing, the time resolution of the thusly embodied electronic warfare receiver is relatively high. In the described embodiment the time of arrival resolution is 0.33 ns.

In addition to the above incorporated by reference herein U.S. Patent documents, several of the concepts involved in the present invention electronic warfare receiver may be better understood with the aid of material presented in my published textbook "Digital Techniques for Wideband Receivers" authored by James Tsui, published by Artech House of Boston and London, and copyright 1995. In particular chapter 4 of this text deals with the subject of Fourier transformation and fast Fourier transformation of signals, chapter 9 with signal detection, including section 9.3.2 in chapter 9 dealing with time domain signal detection and chapter 6 deals with the subject of analog to digital conversion of signals in a wideband receiver such as an electronic warfare receiver. The contents of the "Digital Techniques for Wideband Receivers" textbook are also therefore hereby incorporated by reference herein.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Radar signal analyzing electronic warfare radio receiver apparatus comprising the combination of:

signal presence detecting electrical circuit apparatus connected to a received signal conveying channel portion of said electronic warfare radio receiver apparatus and generating a receiver control signal in response to presence of a received radar signal in said channel portion;

electrical energy dissipating received signal processing electrical circuit apparatus connected with said received signal conveying channel portion of said electronic warfare radio receiver apparatus;

said received signal processing electrical circuit apparatus being operationally enabled and disabled in response to said generated receiver control signal.

2. The radar signal analyzing electronic warfare radio receiver apparatus of claim 1 wherein said electrical energy dissipating received signal processing electrical circuit apparatus comprises a Fourier transform circuit.

3. The radar signal analyzing electronic warfare radio receiver apparatus of claim 1 wherein said signal presence detecting electrical circuit apparatus comprises an In phase and Quadrature phase signals inclusive time domain signal detection circuit.

4. The radar signal analyzing electronic warfare radio receiver apparatus of claim 3 wherein said time domain signal detection circuit further includes first and second analog to digital converter circuits receiving said In phase and Quadrature phase signals and first and second signal data squaring circuits connected with said first and second analog to digital converter circuits.

5. The radar signal analyzing electronic warfare radio receiver apparatus of claim 4 wherein said time domain signal detection circuit further includes a summation circuit connected with said first and second signal data squaring circuits and a selected threshold circuit connected with an output port of said summation circuit.

6. The radar signal analyzing electronic warfare radio receiver apparatus of claim 1 wherein said radar signals are of microwave frequency and wherein said signal presence detecting electrical circuit apparatus comprises a time domain signal detection circuit inclusive of a ninety degree hybrid circuit having phase quadrature output signals and analog to digital converter circuits having digitized phase quadrature signal outputs, outputs coupled to both Fourier transform and first and second signal data squaring circuit portions of said time domain signal detection circuit.

7. The radar signal analyzing electronic warfare radio receiver apparatus of claim 6 wherein said signal presence detecting electrical circuit apparatus further comprises a signal summation circuit connected with output ports of said first and second signal data squaring circuit portions and a receiver control signal-generating comparator circuit connected with an output port of said signal summation circuit and with a threshold level selection circuit.

8. The radar signal analyzing electronic warfare radio receiver apparatus of claim 7 further including a received signal-characterizing encoding logic generation circuit connected with an output port of said Fourier transform circuit portion.

9. The radar signal analyzing electronic warfare radio receiver apparatus of claim 8 wherein said receiver control signal is connected with energization energy-controlling input ports of both said Fourier transform circuit portion and said signal-characterizing encoding logic generation circuit.

10. The method of operating an electronic warfare radio receiver comprising the steps of:
   detecting, in a received signal channel portion of said electronic warfare radio receiver, a presence of received signal data to be processed by said receiver;
   enabling operation of energy consuming signal processing electronic circuit portions of said receiver in response to an output signal from said detecting of received signal data step;
   collecting input signals for said energy consuming signal processing electronic circuit portions of said receiver from said received signal channel portion of said electronic warfare receiver.

11. The method of operating an electronic warfare radio receiver of claim 10 wherein said received signal data to be processed by said receiver comprises pulsed radar signal data.

12. The method of operating an electronic warfare radio receiver of claim 10 wherein said step of detecting, in a received signal channel portion of said electronic warfare radio receiver, a presence of received signal data comprises performing a time domain signal detection operation on said received signal data.

13. The method of operating an electronic warfare radio receiver of claim 10 wherein said step of enabling operation of energy consuming signal processing electronic circuit portions of said receiver in response to an output signal from said detecting of received signal data step includes enabling operation of a Fourier transformation circuit.

14. Low energy consumption time domain signal detection and clockless logic digital electronic warfare radar signal radio receiver apparatus comprising the combination of:
   time domain signal detection signal presence sensing electrical circuit apparatus, including a received signal conveying channel portion therein, connected to a received signal input port of said electronic warfare radar signal radio receiver apparatus and generating a receiver control output signal in response to presence of a received radar signal in said received signal conveying channel portion therein;
   clockless logic, electrical energy dissipating, received signal processing electrical circuit apparatus connected with said received signal conveying channel portion of said time domain signal detection signal presence sensing electrical circuit apparatus and enabled by an active state of said receiver control output signal of said time domain signal detection signal presence sensing electrical circuit apparatus;
   said time domain signal detection signal presence sensing electrical circuit apparatus further including:
   a ninety degree hybrid circuit having In phase and Quadrature phase output signals of said radar signal radio frequency;
   a local oscillator-inclusive radio frequency signal mixer circuit having lower intermediate radio frequency In phase and Quadrature phase output signals in response to input of said In phase and Quadrature phase output signals of said ninety degree hybrid circuit;
   first and second analog to digital converter circuits receiving said intermediate radio frequency In phase and Quadrature phase signals and generating In phase and Quadrature phase digital output signals, output signals also comprising said received signal conveying channel portion signals;
   first and second signal data squaring circuits connected with said channel portion In phase and Quadrature phase digital output signals of said first and second analog to digital converter circuits and generating data squared versions of said In phase and Quadrature phase digital output signals;
   an In phase and Quadrature phase digital output signal summation circuit connected with output signals of said first and second signal data squaring circuits;
   a selected threshold circuit connected with an output port of said signal summation circuit and with a source of selected amplitude threshold reference signal and generating said receiver control output signal;
   said clockless logic electrical energy dissipating received signal processing electrical circuit apparatus further including:
   a clockless logic fast Fourier transform generating electrical circuit having an input port connected with said received signal conveying channel portion signals and enabled by said receiver control output signal; and
   a clockless logic fast Fourier transform signal encoding circuit connected with said fast Fourier transform generating electrical circuit and generating a received signal coded output signal of said electronic warfare radar signal radio receiver apparatus.

* * * * *